United States Patent
Weber et al.

(10) Patent No.: US 6,373,241 B1
(45) Date of Patent: Apr. 16, 2002

(54) SENSOR DEVICE HAVING A MAGNETIC FIELD SENSOR INTEGRATED WITH AN ELECTRONIC CONTROL CIRCUIT

(75) Inventors: Matthias Weber, Baden-Baden; Norbert Knab, Appenweier; Christoph Klappenbach, Buehl; Guenther Riehl; Martin Hager, both of Buehlertal; Friedrich-Wilhelm Dreier, Sinzheim; Michael Soellner, Rheinmuenster; Olaf Bock, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,907
(22) PCT Filed: Mar. 25, 1998
(86) PCT No.: PCT/DE98/00871
  § 371 Date: Nov. 12, 1999
  § 102(e) Date: Nov. 12, 1999
(87) PCT Pub. No.: WO99/13341
  PCT Pub. Date: Mar. 18, 1999

(30) Foreign Application Priority Data
  Sep. 10, 1997 (DE) .......................................... 197 39 682

(51) Int. Cl.7 ............................ G01P 3/487; G01B 7/30; G01D 5/14
(52) U.S. Cl. ............... 324/207.2; 324/174; 324/207.25; 310/68 B
(58) Field of Search ................................ 324/173, 174, 324/207.2, 207.21, 251; 327/510, 511; 310/68 B

(56) References Cited

U.S. PATENT DOCUMENTS

| | | | | |
|---|---|---|---|---|
| 4,066,962 A | * | 1/1978 | Jaffe | 324/207.2 |
| 4,174,841 A | * | 11/1979 | Cousin | |
| 4,884,649 A | * | 12/1989 | Onishi et al. | 310/68 B X |
| 5,300,883 A | * | 4/1994 | Richeson | 324/207.2 X |
| 5,444,369 A | * | 8/1995 | Luetzow | 324/207.2 |
| 5,589,664 A | | 12/1996 | Rode | |
| 5,811,968 A | * | 9/1998 | Nakazawa et al. | 324/207.2 |

FOREIGN PATENT DOCUMENTS

| | | |
|---|---|---|
| DE | 195 25 292 | 1/1997 |
| EP | 387 854 | 9/1990 |
| WO | WO 96 411 20 | 12/1996 |

* cited by examiner

Primary Examiner—Gerard R. Strecker
(74) Attorney, Agent, or Firm—Kenyon & Kenyon

(57) ABSTRACT

In a sensor device including a magnetic field sensor which is arranged in stationary fashion and configured as a Hall sensor and is magnetically coupled to at least one stationary magnetic flux conductor which senses a variable magnetic field and delivers it to the Hall sensor, the Hall sensor delivering to an electronic control circuit an electrical signal which depends on the change in the magnetic field, in order to achieve a reduction in the space required for the electronic control circuit and the Hall sensors it is proposed the at least one Hall sensor, combined with at least one element of the electronic control circuit into an application-specific integrated circuit (ASIC), be arranged in an electronic component.

5 Claims, 2 Drawing Sheets

SENSOR DEVICE HAVING A MAGNETIC FIELD SENSOR INTEGRATED WITH AN ELECTRONIC CONTROL CIRCUIT

FIELD OF THE INVENTION

The present invention relates to a sensor device.

BACKGROUND INFORMATION

Sensor devices of this kind are used, for example, in electric motors to sense a variety of variables which depend on the rotary motion of the motor armature shaft, for example rotation speed, rotation direction, or rotation angle, and are known, for example, from German Pat. No. 195 25 292. A permanent magnet is arranged on a circuit board in the electronics compartment of the electric motor. The two poles of the magnet are connected to magnetic flux conductors which are guided to the motor armature shaft arranged remotely from the electronics compartment, where an end segment of the magnetic flux conductors is spaced away, by a narrow air gap, from a magnetic flux converter which moves along with the motor armature shaft. The moving magnetic flux converter comprises ferromagnetic and diamagnetic segments which are arranged on a rotary element. Rotation of the motor armature shaft results in rotation of the magnetic flux converter, thus causing a change in the magnetic flux in the magnetic circuit constituted by the permanent magnet, the magnetic flux conductors, and the magnetic flux converter. A Hall sensor arranged on the circuit board above the permanent magnet senses the magnetic field change of the leakage field as it changes, and as a function of the change generates an electrical output signal which is delivered to a motor control circuit connected to the Hall sensor.

Also known are sensor devices, for use in an electric motor, in which the magnetic flux converter which moves along with the motor shaft comprises a permanent magnet, nonrotatably joined to the motor armature shaft and configured as an annular magnet, which at the same time is the magnetic field source. Stationary magnetic flux conductors face the annular magnet with their ends which are provided as pickoffs. Associated with the other end of the magnetic flux conductors, facing away from the motor armature shaft with the magnetic flux converter, is a Hall IC which is arranged as a surface-mounted device (SMD), for example on a circuit board in an electronics compartment of the electric motor. Here again, rotation of the motor armature shaft results in a change in the magnetic flux induced in the magnetic flux conductor, and thus in a change in the magnetic field signal sensed by the Hall IC. The Hall IC converts the signal into a digital electrical signal which is analyzed by the motor control electronics arranged on the circuit board and is used to control the motor.

SUMMARY OF THE INVENTION

The sensor device according to the present invention has, in contrast thereto, the advantage that the space required for accommodating the Hall sensors and the electronic control circuit on the support element provided therefor, which for example can be a circuit board, can be considerably reduced. For example, circuit elements belonging to the control electronics, for example the program memory, microprocessor, or EPROM, can be combined with the Hall IC component into an application-specific integrated circuit (ASIC) which is placed onto the circuit board as an individual component. The outlay for component placement on the circuit board is thereby considerably reduced, so that overall costs can be decreased. Cost decreases also result from the fact that the manufacture of an individual ASIC component is considerably more economical than the manufacture of a circuit board onto which all the components necessary for the electronic circuit are placed individually. Advantageously, the magnetic signals are transferred by the magnetic flux conductors directly to the Hall sensor element of the application-specific integrated circuit. The ASIC component can thus be arranged remotely from mechanically moving parts, for example the motor armature shaft of an electric motor, in a manner protected from dirt and moisture. In addition, the small ASIC component can be protected from dirt and moisture more easily than can a complex electronic circuit arranged on a circuit board, thereby also enhancing the overall reliability.

For example, it is advantageous to arrange the ASIC component on a support element, remotely from the magnetic field converter, between the ends of two magnetic flux conductors, so that the magnetic field is optimally sensed by the Hall sensor element contained in the ASIC component.

Magnetic field detection by the Hall sensor element of the ASIC component can be further improved by the fact that a projection of one magnetic conductor passes through an opening in the support element to the mounting surface of the ASIC component.

It is particularly advantageous that if the magnetic flux conductors are in thermally conductive contact with the ASIC component, the magnetic flux conductors can serve not only as signal conductors but also as a heat sinks to dissipate the heat generated by the ASIC component.

DETAILED DESCRIPTION

Figure 1:
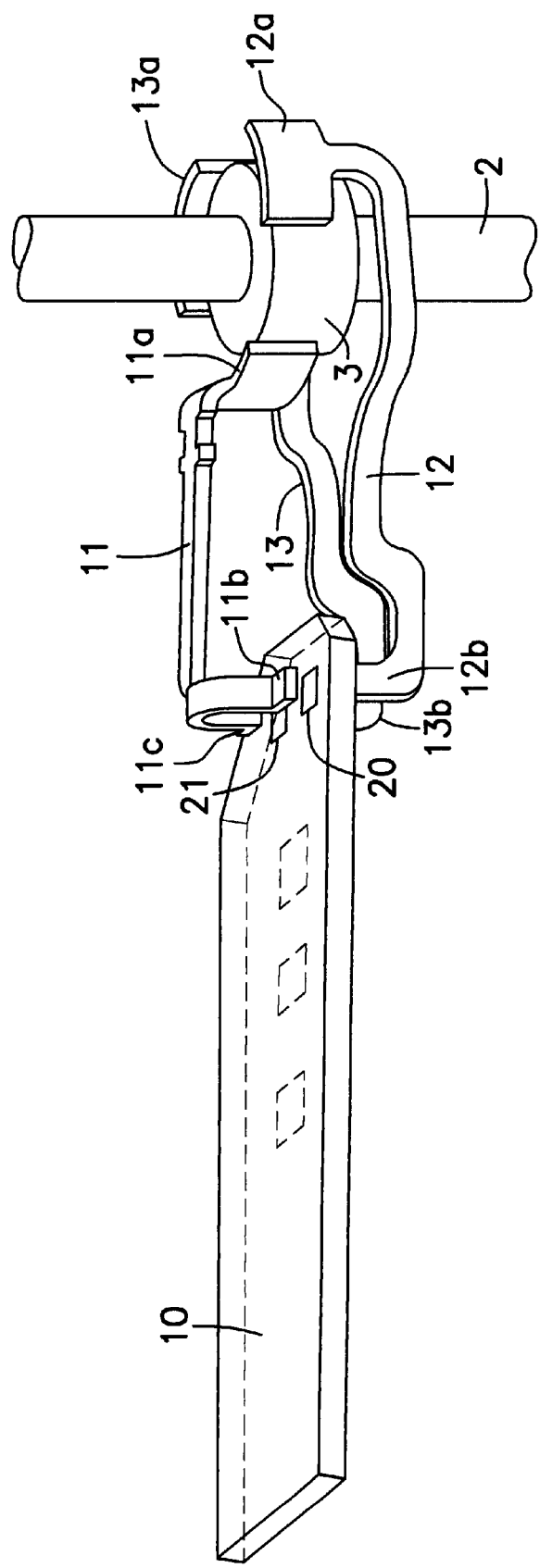
FIG. 1 shows a portion of a sensor device of an electric motor with the magnetic flux converter, the magnetic flux conductors, and a circuit board, as defined in the prior art.

FIG. 1 shows a schematic depiction of a portion of a conventional sensor device which is arranged, for example, in an electric motor. The rotary drive (not depicted) of the motor is connected via a motor armature shaft 2 to the motor transmission (also not depicted). Arranged on motor armature shaft 2 and constituting a magnetic flux converter is a magnetic pole ring 3, one half of which is a north pole and the other a south pole. The magnetic pole ring serves simultaneously as a magnetic flux source and a magnetic flux converter. The sensor device furthermore has three stationary magnetic flux conductors 11, 12, 13 which are made of magnetically soft material with a high permeability. End segments 11a, 12a, and 13a, facing the motor armature shaft, of the magnetic flux conductors are matched in contour to pole ring 3 and are spaced away from the pole ring by a narrow air gap. Magnetic flux conductors 11, 12, 13 are arranged in a brush element (not shown in FIG. 1) which is located between the rotary drive and the motor transmission. The purpose of the brush element is to retain carbon brushes which are in electrical contact with a commutator arranged on the motor armature shaft and are provided for motor current contacting Joined to the brush element is an electronics housing in which a circuit board 10, having an electronic circuit for controlling the motor, is arranged. Magnetic flux conductors 11, 12, 13 are guided in the brush element to the electronics housing and to circuit board 10, on which two Hall IC elements 20, 21 are arranged. The end of magnetic flux conductor 11 bifurcates above the circuit board into two end segments 11b and 11c. End segments 11b and 12b, facing away from the motor shaft, of magnetic flux conductors 11 and 12 terminate above and below Hall IC element 20, and end segments 11c and 13b of magnetic flux conductors 11 and 13 terminate above and below Hall IC element 21. Rotation of motor armature shaft 2 results in a change in the magnetic flux which is induced in the magnetic circuit constituted by magnetic flux conductor 3, stationary magnetic flux conductors 11 and 12, and Hall IC 20. The same is true of the second magnetic circuit constituted by magnetic flux constituted 11 and 13 and Hall IC 21. The change in the magnetic field is converted by Hall IC elements 20, 21 into a digital electrical signal, and delivered to the electronic control circuit provided on circuit board 10. That circuit analyzes the signal in a logic element with the aid of a program-controlled microprocessor or microcontroller, and activates relays, provided on the circuit board, which regulate the current delivered to the electric motor. Current A is delivered via electrical conductors which are connected to motor armature shaft 2 via the carbon fiber brushes and can, for example, encase magnetic flux conductors 11, 12, 13.

Figure 2:
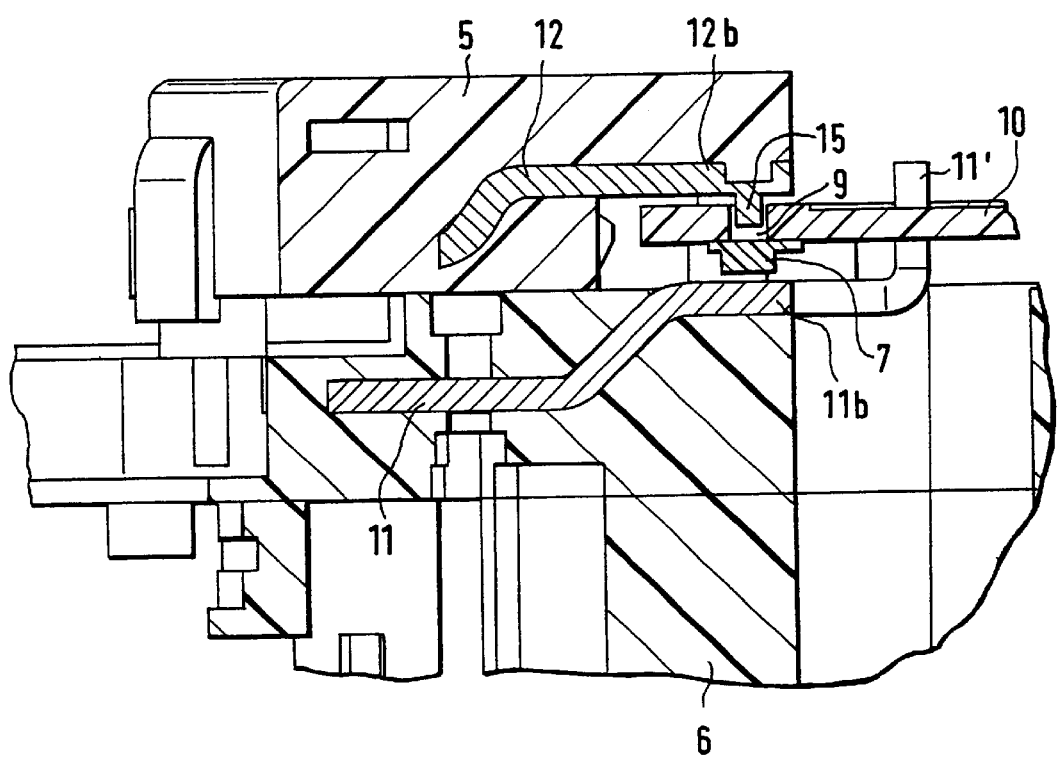
FIG. 2 shows a partially cutaway view of an exemplary embodiment of a sensor device according to the present invention.

FIG. 2 shows a partial view of the sensor device according to the present invention, in cross section. Here again, the sensor device is arranged in an electric motor. It is also possible, however, to arrange the sensor device, for example, in a transmission having a linearly moving and nonrotating magnetic flux converter. The depiction is of a portion of brush holder 6, made of plastic, of the electric motor in which magnetic flux conductor 11 is arranged. Mounted on brush holder 6 is a further component 5 made of plastic having two magnetic flux conductors 12 and 13, of which only magnetic flux conductor 12 is depicted in FIG. 2. A support element 10, which can be configured as a small circuit board or as a stamped grid injection-embedded in plastic, is joined to brush holder 6. Brush holder 6 is arranged in the electric motor so that support element 10 is arranged remotely from the motor armature shaft in an electronics compartment. The electronics compartment has a connector plug (not depicted) having contact elements that are electrically connected to the control circuit on circuit board 10, and are connected via external cables to the central control device of, for example, a motor vehicle.

As in FIG. 1, in the case of the sensor device shown in FIG. 2 the magnetic flux conductors are arranged in brush element 6 and component 5 in such a way that their end segments 11b, 12b are associated with circuit board 10, while their opposite ends 11a, 12a face toward the motor armature shaft. As is evident from FIG. 2, ends 11a and 12a of the magnetic flux conductors are not visible in cross section, since the magnetic flux conductors in brush holder 6 and in component 5 are bent over forward or backward out of the plane of the paper and are arranged, as in FIG. 1, around the movable magnetic pole ring provided as the magnetic flux converter. As is further depicted in FIG. 2, a component 7 containing an application-specific integrated circuit (ASIC) is located on circuit board 10. In the circuit of component 7, two Hall ICs and the control circuit necessary for controlling the motor are combined with the entire logic section to form a single integrated circuit. Microprocessors or microcontrollers and memory components are integrated into the ASIC, and do not need to be placed onto circuit board 10 as separate components. ASIC component 7 is soldered in a conventional manner onto circuit board 10. As is further evident from FIG. 2, there is provided beneath the mounting surface of ASIC component 7 an opening 9 in circuit board 10 through which a projection 15 of end segment 12b of magnetic flux conductor 12 projects to a point just short of the mounting surface of ASIC component 7. Second magnetic flux conductor 13 correspondingly passes through a second opening (not depicted) to ASIC component 7. The end of third magnetic flux conductor 11 bifurcates into two end segments 11b and 11c which pass around the surface located opposite the mounting surface of ASIC component 7 and are bent over toward circuit board 10. In order to retain circuit board 10, the bent-over ends 11' are each passed through a further opening in the circuit board. As is evident from FIG. 2, ASIC component 7 is grasped in pincer fashion by end segmnts 11b and 12b, and end segments 11c and 13b, of the magnetic flux conductors. The two Hall sensor elements are arranged in ASIC component 7 in such a way that the magnetic flux between projections 15 of magnetic flux conductors 12 and 13 and ends 11b and 11c of magnetic flux conductor 11 is optimally sensed by the Hall sensors. The magnetic flux conductors can also be arranged differently than in the example shown here. It is also possible to use only two magnetic flux conductors, e.g. conductors 11 and 12 in FIG. 2, and to integrate only one Hall IC into the ASIC component. If necessary, however, it is also possible to integrate more than two Hall sensors into the ASIC component, and to use four or five magnetic flux conductors. What is critical is that any change in the magnetic flux is converted by the Hall sensor element of the ASIC component into a digital signal that is analyzed within component 7 by the integrated circuit. The output signal of the ASIC component is used for relay activation. In another exemplary embodiment, provision is made not to use relays for current switching, but instead to integrate high-power transistors, which switch the motor currents, directly into the ASIC component. The space required on circuit board 10 for the motor electronics can thereby be reduced even further.

The heat generated by the ASIC component can advantageously be discharged to magnetic flux conductors 11, 12, 13 if the latter are in thermally conductive contact with ASIC component 7. This can be achieved in FIG. 2, for example, with a thermally conductive adhesive introduced into the narrow air gap between the ASIC component and the end segments of the magnetic flux conductors, or by the fact that the magnetic flux conductors are connected directly to the housing of the ASIC component.

What is claimed is:

1. A sensor device, comprising:
   a magnetic field sensor situated in a stationary manner, the magnetic field sensor including at least one Hall sensor;
   at least one stationary magnetic flux conductor magnetically coupled to the magnetic field sensor, the at least one magnetic flux conductor sensing a variable magnetic field and providing the variable magnetic field to the at least one Hall sensor; and
   an electronic control circuit receiving an electrical signal from the at least one Hall sensor, the electrical signal being a function of a change in the variable magnetic field,
   wherein the at least one Hall sensor is combined with at least one element of the electronic control circuit to form an application-specific integrated circuit and is situated in an electronic component.

2. The sensor device according to claim 1, further comprising:

a support element positioned remotely from a magnetic flux converter, the magnetic flux converter generating the variable magnetic field, wherein the at least one magnetic flux conductor includes at least two magnetic flux conductors having end segments, the electronic component being situated between the end segments on the support element, the end segments facing away from the magnetic flux converter.

3. The sensor device according to claim 2, wherein the support element has an opening, the opening being positioned beneath a mounting surface of the electronic component, a projection being provided on one of the at least two magnetic flux conductors, the projection engaging into the opening, another one of the at least two magnetic flux conductors being situated on a surface of the electronic component, the surface being opposite to the mounting surface.

4. The sensor device according to claim 2, wherein at least one of the at least two magnetic flux conductors is in a thermally conductive contact with the electronic component, the at least one of the at least two magnetic flux conductors dissipating a waste heat which is generated by the electronic component.

5. The sensor device according to claim 2, wherein an electric motor includes the sensor device and a motor armature shaft, the magnetic flux converter being situated on the motor armature shaft.

* * * * *